United States Patent [19]

Stritzel

[11] 4,059,026
[45] Nov. 22, 1977

[54] TWO STAGE LIMITED SLIP DIFFERENTIAL
[75] Inventor: Gene A. Stritzel, Webster, N.Y.
[73] Assignee: The Gleason Works, Rochester, N.Y.
[21] Appl. No.: 520,596
[22] Filed: Nov. 4, 1974
[51] Int. Cl.² .............................................. F16H 1/44
[52] U.S. Cl. ..................................... 74/711; 192/108
[58] Field of Search .............. 74/711, 710 S; 192/108, 192/114 T

[56] References Cited
U.S. PATENT DOCUMENTS

| | | | |
|---|---|---|---|
| 1,907,619 | 5/1933 | Soden-Fraunhofen | 192/108 X |
| 2,654,456 | 10/1953 | Wildhaber | 192/108 |
| 3,171,145 | 3/1965 | Benjamin et al. | 192/108 X |
| 3,393,582 | 7/1968 | Mueller | 74/711 |
| 3,546,969 | 12/1970 | Gibson et al. | 74/711 |
| 3,620,338 | 11/1971 | Tomita et al. | 192/108 X |
| 3,811,341 | 5/1974 | Goscenski, Jr. | 74/711 |

Primary Examiner—Samuel Scott
Assistant Examiner—Frank H. McKenzie, Jr.
Attorney, Agent, or Firm—Ralph E. Harper

[57] ABSTRACT

An improved limited slip differential unit includes a torque transmitting coupling which provides for two separate stages of driving action from a drive train to two axle shafts connected to the differential unit. A first stage of operation provides for normal differential action of the unit with no tendency to limit such action or to lock the two axle shafts to each other in their driving relationship with the drive train. A second stage of operation provides for a limitation of differential action under extreme or abnormal driving conditions, and this stage of operation can include a complete locking of the two axle shafts to each other in their relationship to the drive train.

12 Claims, 3 Drawing Figures

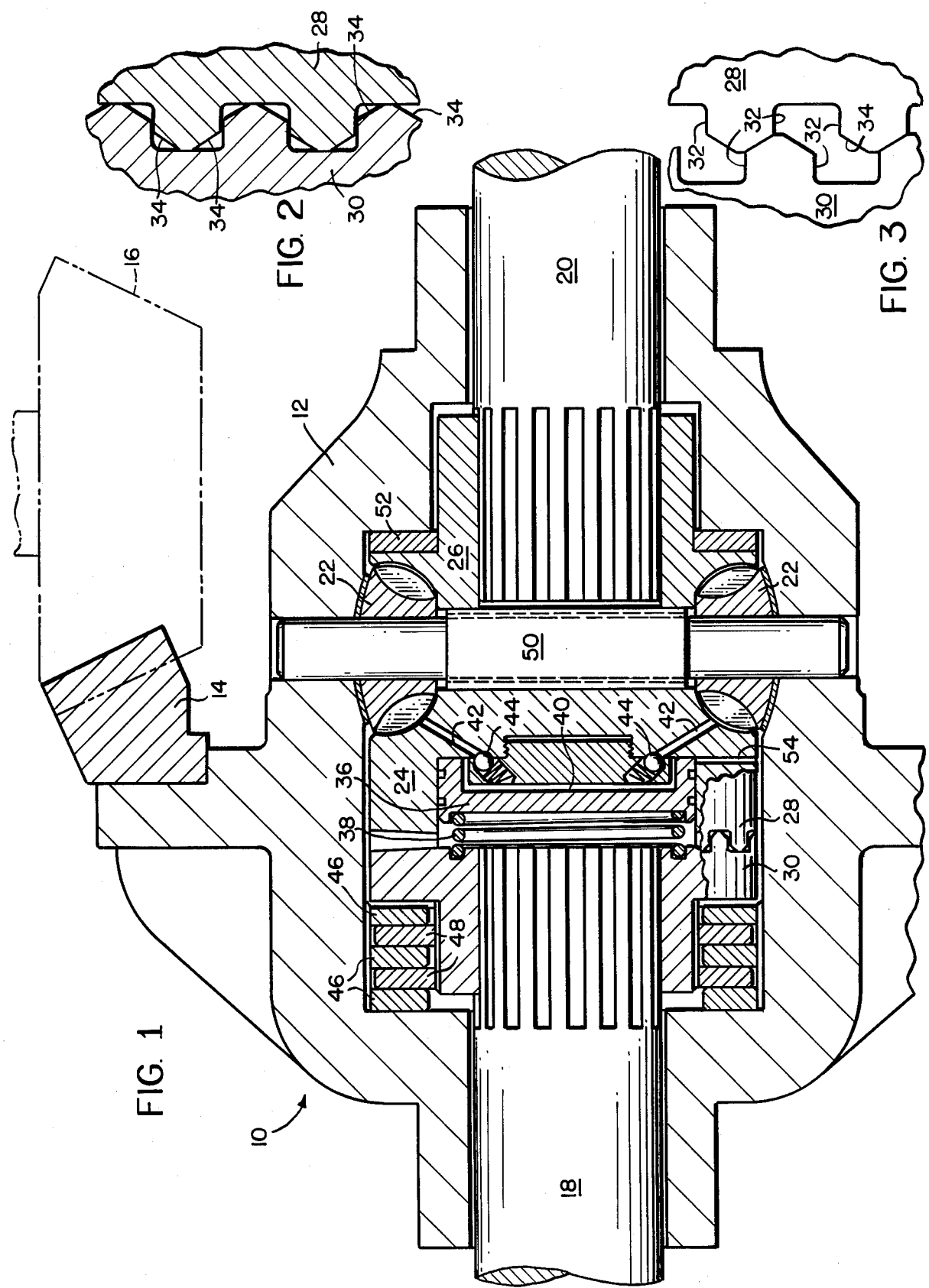

TWO STAGE LIMITED SLIP DIFFERENTIAL

BACKGROUND AND BRIEF DESCRIPTION OF INVENTION

The present invention relates to improvements in known differential units of a type which provide for a locking out of differential action under certain adverse driving conditions. More specifically, the invention provides for an improved assembly which includes two stages of operaton: a first stage in which there is no tendency to lock out normal differential action, and a second stage in which there is a tendency to lock out differential action of the differential unit.

It is known in this art to provide for various locking means in differential units for limiting or preventing normal differential action of such units. A typical arrangement for limiting differential action is illustrated and described in U.S. Pat. No. 2,855,805 wherein a known design of differential unit is provided with a face coupling assembly for transmitting torque between one of the side gears of the differential and its associated axle shaft. The function of the face coupling assembly in this known arrangement is to develop an axial thrust between mating members of the face coupling to thereby move working components of the differential unit to positions which tend to resist normal differential action. Axial thrust is developed from positive pressure angles included on mating surfaces of the face coupling members (see FIG. 2 of the patent), and the basic arrangement is one which provides for varying degrees of axial thrust within the differential unit in accordance with imbalances in driving torque delivered to the separate axle shafts associated with the unit.

Known differential units of the type just described have a characteristic of tending to resist differential action under many driving conditions in which full differential action is needed. Thus, there may be a tendency for a limited slip device or arrangement to resist full differential action when a vehicle is traveling through a curved path so as to cause an outside wheel of an axle system to rotate at a faster rate than an inside wheel of the same system. The differential rate of rotation is sufficient, in many limited slip differential units, to initiate a slight resistance to full differential action, and this can result in unwanted wear and noise in the differential units.

In contrast to prior art arrangements which provide for automatic control of differential action, the present invention provides for an automatic control which does not tend to limit or resist full differential action during a wide range of normal driving conditions for the axle system with which it is associated. Thus, there is no tendency, with the differential unit of the present invention, for a limited slip device to resist normal overriding of one wheel relative to another in the axle system, and full differential action is obtained at all times in a first stage of operation of the differential unit. On the other hand, extreme imbalances in torque transmission will result in an automatic shifting of certain components of the differential unit to a second stage of operation which provides for a resistance to differential action when it is most needed.

In accordance with the present invention, a novel face coupling assembly is included in a known type of differential unit, and the novel face coupling assembly includes two mating sections which can be axially shifted to separate positions of driving contact so as to provide for two distinct driving characteristics through the differential unit. In addition, there is provided a hydraulically actuated control means for moving the mating sections of the face coupling assembly between their separate positions for transmitting torque.

In a preferred embodiment of the invention, a known design of differential unit is provided with a face coupling assembly located between one of its side gears and an associated axle shaft for effecting a change in relative rotation between both axle shafts of the system in accordance with axial positioning of mating sections of the improved face coupling assembly. The face coupling assembly is of the type which includes a first coupling section having tooth formations formed on a face thereof for meshing with tooth formations formed on a corresponding face of a mating section. Each tooth formation, of both coupling sections, is provided with a zero pressure angle portion at a base thereof together with a positive pressure angle portion extending from the zero pressure angle portion to a tip thereof. The tooth formations of both of the coupling sections are shaped and dimensioned to mesh with each other in a driving relationship which includes (a) a first position in which zero pressure angle portions of mating tooth formations contact each other and (b) a second position in which positive pressure angle portions of mating tooth formations contact each other. In addition, a control means is included for effecting relative axial shifting of the first and second coupling sections of the assembly, and the control means can include a piston member fitted within the assembly and operatively connected to one of its coupling sections so as to urge that coupling section axially away from the other coupling section when a hydraulic force is applied to a working face of the piston member. Hydraulic force for actuating the control means can be developed by pumping action of gears contained within the differential unit.

These and other features and advantages of the present invention will become apparent in the more detailed description which follows and in that description reference will be made to the accompanying drawings as briefly described below.

BRIEF DESCRIPTION OF DRAWINGS

FIG. 1 is a vertical elevation, partly in cross-section, of a typical differential unit which has been modified to incorporate the two stage coupling assembly of the present invention;

FIG. 2 is an enlarged view in section of a driving relationship which exists between mating section of the coupling assembly of the present invention when the assembly is operating in a first stage for transmitting torque to an associated axle shaft; and FIG. 3 is a view similar to FIG. 2 showing a driving relationship between mating sections of the improved coupling assembly when it is operating in a second stage for transmitting torque to an associated axle shaft.

DETAILED DESCRIPTION OF THE INVENTION

Referring to FIG. 1, the present invention can be understood with reference to a differential unit 10 having features of construction very similar to those shown in U.S. Pat. No. 2,855,805. The illustrated differential unit includes a case 12 which carries a ring gear 14 for receiving driving moments from a drive train which includes a drive pinion 16. The case 12 is mounted for rotation within a differential housing (not illustrated) so as to transmit driving moments from the drive train to a first axle shaft 18 and a second axle shaft 20 of an axle system which includes at least one wheel fixed to each of the axle shafts.

As is known in this art, differential units of the type illustrated function to divide torque between the two axle shafts 18 and 20 so as to drive the wheels of an axle system while, at the same time, providing for rotation of one axle shaft relative to the other. This is accomplished through a known system which provides for transmission of torque from at least one pinion gear 22 (two being illustrated in FIG. 1) to two side gears 24 and 26 operatively connected to the axle shafts 18 and 20, respectively. This basic arrangement is shown in U.S. Pat. No. 2,855,805 and can be fully understood by persons skilled in this art by reference to the disclosure of that patent which is incorporated herein by reference to the extent necessary to explain known practices in this art.

It can be seen from the FIG. 1 layout that the side gear 26 is connected to its associated axle shaft 20 with splines formed on an end of the axle shaft 20. The opposite side gear 24 is operatively connected to its associated axle shaft 18 through a face coupling assembly which transmits torque from a first mating section 28 to a second mating section 30. The first mating section 28 may be formed integrally with the side gear member 24, as illustrated in FIG. 1, or a separate face coupling section can be secured to the back of a side gear member to establish the relationship shown. The second mating section 30 is secured to an end of the axle shaft 18 with splines. This arrangement for transmitting torque through a face coupling assembly can be more fully appreciated from a study of U.S. Pat. No. 2,855,805 in which a face coupling assembly is used for a similar purpose.

In accordance with prior art designs which utilize face coupling assemblies in differential units, the face coupling assembly is provided with tooth formations designed to impart an axial thrust between mating sections of the assembly so as to move the mating sections away from each other. This separation of the mating sections provides for a frictional engagement of certain components of the differential with portions of its case so as to lock both axle shafts to the case, and thus, the normal differential action of the unit is bypassed. The degree of axial thrust which develops between the mating sections is a function of resistance to torque transmission between the two mating sections of the face coupling assembly. With reference to the above-identified patent, it can be appreciated that the tooth design of such face coupling assemblies was intended to provide a degree of mechanical leverage between the separate sections of such assemblies at substantially all levels of torque transmission. It can be appreciated from this that even relatively low levels of torque imbalance in such prior art arrangements could result in an initiation of separation of the face coupling assembly so as to resist or limit the degree of differential action available. Thus, there could be unwanted overriding of normal differential action of the unit in a way which could cause unnecessary wear of working components or which could result in lack of full control over the axle system.

In contrast to prior art designs, the coupling assembly of the present invention is provided with a novel tooth design which establishes two different driving characteristics for the differential unit, and these driving characteristics are determined by relative axial positions of the face coupling sections 24 and 30. As shown in better detail in FIGS. 2 and 3, each tooth formation of each of the mating sections 28 and 30 includes a zero pressure angle portion 32 at a base portion thereof (see FIG. 3) and a positive angle portion 34 extending to a tip portion thereof (see FIG. 2). FIG. 2 illustrates a first position of mating contact between mating sections of the coupling assembly wherein the mating tooth formations of the two sections 28 and 30 are in a relative axial position which provides for a driving contact between zero pressure angle portions of the mating teeth. In this position of mating contact, there is no mechanical leverage between the mating sections and therefore, there is substantially no tendency for the mating sections of the face coupling assembly to move axially away from each other in a way that would interfere with full differential action of the unit. This relationship continues within a predetermined range of relative rotation of one axle shaft compared to the other, but when one of the axle shafts rotates at a rate which is beyond the designed range of operation for the FIG. 2 position of the coupling sections there is an automatic displacement of the coupling sections 28 and 30 axially away from one another so as to establish a second position of mating contact as shown in FIG. 3. In the second position, an axial thrust is developed between mating sections 28 and 30 in accordance with a mechanical cam action between the positive pressure angle portions 34 of contacting tooth formations.

In the illustrated embodiment of the invention, a control means for effecting relative axail shifting between the coupling sections 28 and 30 includes a piston member 36 which can be advanced (towards the left in the FIG. 1 orientation) into contact (either direct contact or through another member) with the coupling section 30 so as to urge that coupling section axially away from the coupling section 28. A return spring 38 functions to return the piston member 36 to the starting position shown in FIG. 1. The piston member 36 is fitted and sealed within a chamber formed within the coupling assembly so that axial movement of the piston member towards the left can be effected with a hydraulic force applied to a working face 40 formed into the piston member 36. The hydraulic force is supplied by hydraulic fluid pumped against the working face 40 by any suitable means. In the FIG. 1 embodiment, the pinion gears 22 operate as pumping means for trapping hydraulic fluid into bottomlands of the teeth formed on side gear 24. A number of flow passages 42 are formed in the side gear 24 to provide a communication between the trapping zones for hydraulic fluid and the working face 40 of the piston member 36. One-way valve means 44 of known construction are included in the flow passages 42 to prevent an escape of hydraulic fluid from the piston chamber at points of rotation of the side gear member 24 where there is no meshing engagement with pinion gears 22. The pinion gears 22 and the side gears 24 and 26 may be of a type which include concave bottomlands between tooth formations and convex toplands on the tooth formations which mesh with such bottomlands. This type of gear design is known in the art as described more fully in U.S. Pat. No. 3,820,414 incorporated herein by reference to the extent necessary to understand the gear geometry of such bevel gears. However, more conventional forms of pinion and side gear designs may be used if desired.

In operation, driving moments applied to the differential case 12 are divided between the axle shafts 18 and 20 in a conventional way with the coupling assembly in the first position shown in FIGS. 1 and 2. A selected range of relative rotation of the axle shafts 18 and 20 is available to the axle system when the coupling assembly is in the first position. The range of operation for this first position can be determined by the particular designs of the gears which are used for pumping hydraulic fluid, the number of flow passages 42 which are available for delivering hydraulic fluid to the working face of piston member 36, and the relationships provided between tooth formations of the coupling sections 28 and 30. In this first position of operation, the zero pressure angle portions 32 of the coupling sections 28 and 30 are in driving contact, and there is no tendency for the differential unit to resist or limit its normal differential function. Thus, full differential action is available as long as the coupling sections 28 and 30 are in the first position illustrated in FIGS. 1 and 2.

If the relative rotation of two axle shafts exceeds the predetermined range which has been designed into the unit for maintaining the coupling sections 28 and 30 in their first position, there is a sufficient pumping of hydraulic fluid against the piston member 36 to force the piston member towards the left in FIG. 1 until it makes contact with the coupling section 30. Continued pumping of hydraulic fluid causes the piston member 36 to urge the coupling section 30 against braking rings 46 which are fixed to the differential case 12, and this action is assisted by movement of the positive pressure angle portions 34 of the coupling assembly into driving contact with each other (as shown in FIG. 3). Braking discs 48 which are carried by the coupling section 30 may be provided to increase frictional contact between the coupling section 30 and the surfaces of the braking discs 46. Once the coupling sections 28 and 30 are in their second position, as shown in FIG. 3, the positive pressure angle portions 34 of the coupling sections tend to urge the coupling assembly into tighter contact with the locking means of the differential unit until all differential action of the unit is bypassed and there is an effective locking of the axial shaft 18 to the axle shaft 20. At no time do the coupling sections 28 and 30 move out of contact with each other. A similar action takes place on the opposite side of the differential unit inasmuch as hydraulic pressure which is applied to the piston member 36 tends to force the side gear 24 towards the right (in the FIG. 1 view) against a bearing block member 50 which, in turn, bears against the side gear 26 to engage it with a friction ring 52. This locking action continues until the torque differential between coupling sections 28 and 30 is decreased to a level where hydraulic fluid is dumped from behind the piston member 36 (through one or more return passageways 54) at a faster rate than it is being delivered to the working face of the piston member 36. Spring member 38 tends to urge the piston member 36 back to a position where it is out of engagement with the coupling section 30, and eventually the coupling sections 28 and 30 return to their first positions of operation as illustrated in FIGS. 1 and 2. Thus, it can be appreciated that the locking feature of the differential unit does not become effective until a predetermined abnormal driving relationship exists between the axle shafts 18 and 20.

Having described structural details of one embodiment of the present invention, it can be appreciated that various modifications can be made in the basic coupling assembly to provide for two stages of operation as defined herein. For example, other forms of control may be used for shifting the coupling sections 28 and 30 toward and away from each other, and manual control of a hydraulic pumping means can be provided if desired. The assembly which is illustrated can be easily manufactured and adapted to existing designs for differential units at a reasonable cost and with minimal amount of modification of such units. The type of tooth formation illustrated for the coupling sections 28 and 30 can be formed on metal members in accordance with known techniques and with known apparatus. For example, the tooth members can be formed on a blank with a cup-shaped grinding wheel in accordance with the basic teachings of U.S. Pat. No. 2,384,583 using a grinding wheel profile which is shaped to impart the type of zero and positive pressure angle relationships which are required for each tooth profile. Alternatively, known gear cutting machines can be used to produce the disclosed tooth profiles.

Various modifications and substitutions of equivalent structures to those described above will become apparent to persons skilled in this art, and all such equivalent structures and functions are intended to be included within the scope of the claims which follow.

What is claimed is:

1. In a differential unit for controlling relative rotation between first and second axle shafts through a known system of side gears operatively connected to said axle shafts and arranged to mesh with at least one pinion gear mounted to receive a driving moment from a prime mover, the improvement comprising a face coupling assembly operatively connected with a selected one of said side gears for transmitting a driving moment from said pinion gear and said selected side gear to one of said axle shafts, said face coupling being assembled form two mating sections which can be moved axially relative to each other so as to provide (a) a first position of mating contact in which there is substantially no tendency for the mating sections of the face coupling assembly to move axially away from each other within a range of relative rotation of one of said axle shafts compared to the other of said axle shafts and (b) a second position of mating contact in which there is developed an axial thrust between said mating sections of said face coupling when the relative rate of rotation of one of said axle shafts compared to the other of the axle shafts exceeds said range, control means for effecting relative axial shifting of mating sections of said face coupling assembly from said first position of mating contact to said second position of mating contact, and locking means engageable by said face coupling assembly when said mating sections of the assembly are moved axially to said second position of mating contact, said locking means being arranged to limit differential rates of rotation between said axle shafts.

2. The improvement of claim 1 wherein said mating sections of said face coupling assembly are provided with face tooth formations having a configuration which includes a zero pressure angle base portion for each tooth and a positive pressure angle extending from the base portion to a tip portion of each tooth, said tooth formations being shaped and dimensioned to mesh with each other in a driving relationship which includes (a) said first position of mating contact in which said zero pressure angle portions of mating tooth formations contact each other and (b) said second position of mating contact in which said positive pressure angle portions contact each other to develop an axial thrust between said mating sections.

3. The improvement of claim 1 wherein one of said mating sections of said face coupling assembly carries said selected side gear as an integral part thereof.

4. The improvement of claim 1 wherein said control means includes
a piston means operatively associated with said face coupling assembly for moving said mating sections axially away from each other when fluid pressure is developed against a working face of the piston means, and
pumping means for pumping hydraulic fluid against said working face of said piston means to thereby develop sufficient fluid pressure to move said piston means.

5. The improvement of claim 4 wherein said piston means is fitted within a chamber formed in said face coupling assembly so as to bear against one mating section of the assembly when hydraulic pressure is developed against the working face thereof.

6. The improvement of claim 5 and including a spring means for normally urging said piston means into an inoperative position in which it is not effective for moving mating sections of said face coupling assembly away from each other.

7. The improvement of claim 4 wherein said pumping means comprises one of said side gears and said pinion gear meshing therewith so as to trap hydraulic fluid therebetween, and including
a flow passage between said pumping means and the working face of said piston means for delivering a flow of hydraulic fluid from the pumping means to the piston means, and
one-way valve means included in said flow passage for preventing a back flow of hydraulic fluid away from said piston means.

8. The improvement of claim 7 wherein said side gears and said pinion gear of the differential unit are of a type which include concave bottomlands between tooth formations meshing with said bottomlands.

9. In a differential unit for controlling relative rotation between first and second axle shafts operatively connected to two side gears carried within a case which is driven from a common drive train so as to carry at least one pinion gear in meshing engagement with said two side gears, and in which there is included a face coupling assembly between one of said side gears and its associated axle shaft for effecting a change in relative rotation between said axle shafts in accordance with a torque differential established between separate sections of said face coupling assembly, the improvement in said face coupling assembly comprising
a first coupling section having tooth formations formed on a face thereof for meshing with tooth formations formed on a face of a mating coupling section, each of said tooth formations being of a configuration which includes a zero pressure angle portion at a base thereof and a positive pressure angle portion extending from the zero pressure angle portion to a tip thereof,
a second coupling section having tooth formations formed on a face thereof for mating with said first section, said tooth formations of said second coupling section being similar or identical in configuration to the tooth formations of the first section, the tooth formations of both said first and second coupling sections being shaped and dimensioned to mesh with each other in a driving relationship which includes (a) a first position in which zero pressure angle portions of mating tooth formations contact each other and (b) a second position in which the positive pressure angle portions of mating tooth formations contact each other,
control means for effecting relative axial shifting between said first and second coupling sections of said face coupling assembly so as to control the driving relationship of said coupling sections in said first and second positions, and
locking means positioned between said coupling assembly and a case portion of said differential unit for locking said coupling assembly to said case after said first and second sections of the coupling assembly are moved to said second position.

10. The improvement of claim 9 wherein said control means includes
a piston member fitted in a chamber and operatively connected to one of said coupling sections so as to urge that coupling section axially away from the other coupling section to thereby shift the coupling sections from said first position to said second position, and
pumping means for pumping hydraulic fluid into the chamber for said piston member to thereby urge said coupling sections away from each other.

11. The improvement of claim 10 wherein said pumping means comprising one of said side gears and said pinion gear meshing therewith in said differential unit.

12. The improvement of claim 11 wherein said side gears and said pinion gear of the differential unit are of a type which include concave bottomlands between tooth formations together with convex toplands on each tooth formation for meshing with said bottomlands.

* * * * *